(12) United States Patent
Andrei et al.

(10) Patent No.: US 10,955,092 B2
(45) Date of Patent: *Mar. 23, 2021

(54) METHOD OF PREPARING LIQUID MIXTURES

(75) Inventors: Catalin Andrei, Uppsala (SE); Mikael Berg, Uppsala (SE); Torbjorn Blank, Uppsala (SE); Enrique Carredano, Uppsala (SE); Karl Ekstrom, Uppsala (SE); Tomas M. Karlsson, Uppsala (SE); Jan-Erik Lynga, Uppsala (SE); Roger Nordberg, Uppsala (SE); Gustav Rodrigo, Uppsala (SE); Henrik Sandegren, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 380 days.

This patent is subject to a terminal disclaimer.

(21) Appl. No.: 13/704,270

(22) PCT Filed: May 5, 2011

(86) PCT No.: PCT/SE2011/050563
§ 371 (c)(1),
(2), (4) Date: Dec. 14, 2012

(87) PCT Pub. No.: WO2011/162666
PCT Pub. Date: Dec. 29, 2011

(65) Prior Publication Data
US 2013/0081703 A1 Apr. 4, 2013

(30) Foreign Application Priority Data

Jun. 23, 2010 (SE) .................................. 1050668-1

(51) Int. Cl.
*F17D 3/00* (2006.01)
*G01N 30/34* (2006.01)
*G05D 21/02* (2006.01)

(52) U.S. Cl.
CPC ............... *F17D 3/00* (2013.01); *G01N 30/34* (2013.01); *G05D 21/02* (2013.01); *Y10T 137/0329* (2015.04)

(58) Field of Classification Search
CPC .. G01N 30/34; G01N 2030/326; G01N 30/32; G01N 30/02; G01N 30/36;
(Continued)

(56) References Cited

U.S. PATENT DOCUMENTS 3,712,513 A    1/1973   Ashmead et al.
4,533,254 A *  8/1985   Cook et al. ................. 366/176.1
(Continued)

FOREIGN PATENT DOCUMENTS

EP    2585887 A1      5/2013
JP    H05264500 A  * 10/1993   ........... G01N 27/416
(Continued)

OTHER PUBLICATIONS

International Search Report and Written Opinion Received for PCT Patent Application No. PCT/SE2011/050563, dated Sep. 30, 2011, 11 Pages.
(Continued)

*Primary Examiner* — Waqaas Ali
(74) *Attorney, Agent, or Firm* — Eversheds Sutherland (US) LLP (57) ABSTRACT

There is provided a method of preparing a mixed liquid having a first property and a second property. The method includes providing a first set of liquids, a second set of liquids, and a third set of liquids. The method includes combining the provided sets of liquids. Further, the method includes varying at least one of the liquid flows of the first and second sets and at least one liquid flow of the third set
(Continued)

to adjust the first property and the second property to their respective predetermined values in the resulting mixed liquid flow.

24 Claims, 4 Drawing Sheets

(58) Field of Classification Search
CPC ....... G01N 2030/347; G01N 2030/324; G01N 30/74; G01N 2030/328; G01N 2030/342; G01N 30/24; G01N 2030/027; B01D 15/166; A61K 2300/00
USPC ..... 210/101, 198.2, 639, 656, 739; 366/142, 366/151.1, 152.1, 152.4, 160.1, 73, 61.56; 422/110, 111; 436/161, 171
See application file for complete search history.

(56) References Cited

U.S. PATENT DOCUMENTS

| | | | |
|---|---|---|---|
| 5,738,772 A * | 4/1998 | Bartasis | A23C 19/082 |
| | | | 118/664 |
| 6,221,250 B1 * | 4/2001 | Stafstrom | 210/656 |
| 6,224,778 B1 * | 5/2001 | Peltzer | C02F 1/008 |
| | | | 137/3 |
| 7,465,382 B2 | 12/2008 | Paul et al. | |
| 7,750,129 B2 | 7/2010 | Johansson et al. | |
| 7,790,025 B2 | 9/2010 | Tsonev et al. | |
| 7,838,640 B2 | 11/2010 | Yoshiyama et al. | |
| 8,271,139 B2 * | 9/2012 | Bellafiore | G05D 11/139 |
| | | | 700/265 |
| 8,297,936 B2 * | 10/2012 | Witt et al. | 417/32 |
| 8,540,120 B2 * | 9/2013 | Newton | B67D 1/0016 |
| | | | 222/129.1 |
| 2003/0046983 A1 * | 3/2003 | Sato et al. | 73/53.01 |
| 2003/0052007 A1 * | 3/2003 | Paul | G01N 30/32 |
| | | | 204/450 |
| 2004/0102380 A1 | 5/2004 | Fulton et al. | |
| 2005/0273203 A1 | 12/2005 | Bellafiore et al. | |
| 2005/0286340 A1 | 12/2005 | Urquhart | |
| 2008/0022765 A1 * | 1/2008 | Witt et al. | 73/199 |
| 2008/0080981 A1 * | 4/2008 | Witt et al. | 417/32 |
| 2008/0279038 A1 * | 11/2008 | Bellafiore et al. | 366/152.4 |

FOREIGN PATENT DOCUMENTS

| | | |
|---|---|---|
| JP | 2006-119945 | 5/2006 |
| WO | WO 2005/025726 | 3/2005 |
| WO | WO 2009/131524 | 10/2009 |
| WO | 2011/162666 A1 | 12/2011 |

OTHER PUBLICATIONS

International Preliminary Report on Patentability Received for PCT Patent Application No. PCT/SE2011/050563, dated Dec. 28, 2012, 7 Pages.

Extended European Search Report Received for European Patent Application No. 11798441.9, dated Apr. 6, 2017, 4 pages.

* cited by examiner

20mM Citrate pH 3.5 385, 600, 385 L/h

20mM Citrate pH 3.5-5.9 500 L/h

FIG. 4

METHOD OF PREPARING LIQUID MIXTURES

CROSS-REFERENCE TO RELATED APPLICATIONS

This application is a filing under 35 U.S.C. 371 of international application number PCT/SE2011/050563, filed May 5, 2011, published on Dec. 29, 2011 as WO 2011/162666, which claims priority to application number 1050668-1 filed in Sweden on Jun. 23, 2010.

FIELD OF THE INVENTION

The present invention relates to the preparation of liquid mixtures, and more particularly to the preparation of mixed liquid flows, such as buffer flows, having pre-defined characteristics.

BACKGROUND OF THE INVENTION

In many industrial processes it is important to obtain liquids of precisely known composition and/or other characteristics, such as pH, ionic strength, viscosity, density etc. It is further not uncommon that the composition of the liquid should not only be at each moment precisely known and controlled, but also should vary with time in a precise and controlled manner.

Such liquids are usually obtained by mixing or blending two or more liquids with each other, typically using a blending system, usually an on-site blending system, which may provide for both isocratic and gradient blending modes (step gradient and linear gradient).

One application where the composition of liquids is of utmost importance is in the field of liquid chromatography, when buffers having a specified pH and optionally also ionic strength are utilized, the pH and ionic strength of the eluent being the two most important parameters that control selectivity of protein separations in chromatography, such as on ion exchange resins. Another such application is filtration.

Blending systems for delivery on-line of a desired liquid composition are typically based on two different approaches, i.e. (i) use of sensor feedback control of measured liquid parameters to set the proportions of liquid components giving the desired composition, and (ii) flow feedback control, wherein a recipe or formula for the mixing ratios of the liquid components to obtain the desired liquid composition are calculated, and wherein these proportions are then maintained by control via feedback of respective flow rates.

An example of the first-mentioned approach is disclosed in US 2008/0279038 A1 which describes a blending system for blending three liquids, a feed liquid and first and second adjusting liquids, using a continuous mode of operation. The feed liquid is, for example, water and the adjusting liquids may be a salt concentrated solution and alcohol, respectively. The liquids are mixed in a recirculation loop. The conductivity of the recirculated solution is sensed by a conductivity sensor communicating with a system controller which controls the valves and pumps of the system. A near infrared (NIR) sensor detects the alcohol concentration. When the target conductivity and the alcohol concentration levels have been attained, the output of the loop is delivered to the process. The salt concentrate solution and alcohol addition rates continue to be based on feedback control from the conductivity sensor and NIR sensor.

A different approach to liquid blending is to determine the exact relative component proportions or ratios in which liquids are to be blended to obtain a desired liquid mixture having the pre-defined characteristics, typically using an appropriate algorithm, and then produce a liquid mixture flow by feeding the different liquids by a metering system in the predetermined ratios.

An example of the above-mentioned second approach, which uses "flow feedback control" rather than "liquid parameter control", is disclosed in U.S. Pat. No. 6,221,250 B1, where an apparatus for liquid chromatography comprises an on-line metering device capable of feeding into a chromatographic separation device an eluent of one or more buffering species, an acid or a base, optionally a salt, and a solvent. The metering device calculates, by the use of an approximation of the Debye-Hückel equation, the relative proportions of the components required to obtain an eluent of a selected pH at a given salt concentration. This is accomplished by an iterative procedure where the different components are concomitantly varied in such a way as to take into account the interrelationship of the pH and the ionic strength in the liquid mixture.

A development of this method, which permits the use of higher concentrations of buffer and/or salt is disclosed in WO 2009/131524 A1. Here a mixer control unit is provided to control the relative component proportions using the equation of Debye-Hückel, wherein the ion size $\alpha$ in the Debye-Hückel equation is determined as the weighted mean ion size of all species contributing to the ionic strength of the liquid mixture, wherein the ionic strength of each species is used as weighting parameter. In this improved method, which preferably is computer-implemented, the exact composition is first calculated and the liquid mixture, typically a buffer, is subsequently prepared in a single step. In one embodiment, the buffer definition is obtained in-line in a continuous process.

A disadvantage of the above-mentioned methods based on calculation of the component proportions is, however, that one must know the exact concentrations and/or other characteristics of the stock solutions at the time of use. This deficiency is remedied by the method disclosed in International application publication number WO 2011/037530, wherein at least two different component stock solutions are mixed with each other and which comprises the steps of determining a selected property value for one or more of the stock solutions by sensing, in a flow of each stock solution separately, at least one characteristic related to the property value for the stock solution, and based on the determined property value or values, mixing the stock solution flows in mixing ratios giving the desired mixed liquid flow.

It is an object of the present invention to provide an alternative, and in several respects improved method for preparing a liquid mixture flow, such as a buffer, having pre-defined characteristics according to the first-mentioned approach based on feedback control via sensed liquid parameters, which may optionally be used together with the second method approach based on flow metering feedback control, and which may conveniently be automated, such as computer-implemented.

SUMMARY OF THE INVENTION

The above-mentioned object as well as other objects and advantages are achieved by the liquid blending method according to the present invention, which provides a mixed liquid flow, typically a buffer flow, having desired characteristics by mixing at least three different liquid flows, wherein two (or more) of the liquids have different values of a desired property and the proportions of which are varied to obtain the desired property. A buffer flow, for example, having predetermined buffer concentration and pH and optionally also conductivity and/or salt concentration, or pH and conductivity, may be obtained by mixing flows of buffer components, solvent (typically water), and optionally salt.

A basic feature of the method, when preparing, for instance, a buffer flow having a desired pH and buffer concentration, resides in first preparing a buffer flow having the desired buffer concentration using initial preselected mutual proportions of basic and acidic buffer component flows (typically of respective stock concentrations), and then adjusting the pH to the desired pH value by varying the buffer component flows, preferably by while simultaneously varying the other liquid flow or flows to maintain the buffer concentration constant.

The method of the invention is, however, not restricted to preparing buffer flows, but a variety of other mixed liquid flows may be prepared. Likewise, the predetermined characteristics or properties are not limited to pH and buffer concentration.

In its broadest aspect, the present invention therefore provides a method of preparing a mixed liquid flow having predetermined characteristics, including a predetermined value of a first property and a predetermined value of a second property, comprising the steps of:
a) providing a first set of at least one liquid flow each having a different first value of the first property;
b) providing a second set of at least one liquid flow each having a different second value of the first property;
c) providing a third set of at least one liquid flow of solvent;
d) combining the provided liquid flows; and
e) varying at least one of the liquid flows of the first and second sets and at least one liquid flow of the third set to adjust the first property and the second property to their respective predetermined values in the resulting mixed liquid flow.

In step e) above, the liquid flows of the first and second sets may be varied sequentially or simultaneously.

The first and second properties are typically selected from pH, conductivity, concentration and absorbance.

The first property of the first and second sets of liquid flows generally is a true property of the liquids, excluding liquids devoid of the property, i.e. the property values are different from zero.

In a preferred embodiment of the method, a constant flow rate of the mixed liquid flow is maintained by variation of at least one liquid flow of the third set.

While the solvent is typically an aqueous liquid, preferably water, it may also be another liquid, such as an organic liquid or liquids.

The mixed liquid flow is typically a buffer flow. In this case, each liquid flow of the first set contains at least one basic buffer component and each liquid flow of the second set of liquid flows contains at least one acidic buffer component, or vice versa. Optionally, either at least one basic buffer component is replaced by a strong base, or at least one acidic buffer component is replaced by a strong acid.

The term buffer component is to be interpreted in a broad sense, including any substance having buffering properties. A liquid flow may contain more than one buffer component in order to prepare a buffer mixture, for example. A buffer mixture may, of course, also be prepared by mixing two or more liquid flows each containing a single buffer component.

In one variant of the method for preparing a buffer flow, the first property is pH and the second property is buffer concentration. Step e) of the method above, then comprises varying the at least one of the liquid flows of the first and second sets to adjust the pH to its predetermined value.

In another variant, the first property is a property other than pH, typically conductivity or absorbance, and the second property is buffer concentration. Step e) of the method then comprises varying the at least one of the liquid flows of the first and second sets to adjust the first property to its predetermined value.

In still another variant, the first property is pH and the second property is a property other than buffer concentration and pH, typically conductivity or absorbance. Step e) of the method then comprises varying the at least one of the liquid flows of the first and second sets to adjust the pH and the second property to their predetermined values.

While determination of pH is typically performed with a pH meter or sensor, the pH may also be determined by an indirect method. An exemplary such indirect method comprises measuring conductivity as described in Swedish patent application number 1051344-8, filed on Dec. 17, 2010 (the disclosure of which is incorporated by reference herein).

That document describes prediction of the conductivity of a liquid solution, such as a buffer by solving the exact concentrations of the different ions present in solution including the equilibrium concentration of each of the charged species of a weak electrolyte, determining the molar conductivity of each of the charged species, calculating the corresponding conductivities, and summing up all the individual conductivities to obtain the total conductivity of the liquid mixture. The described conductivity prediction steps may, however, also be used for indirect determination of pH from the measured conductivity of a solution. A corresponding device for measuring pH comprises a conductivity sensor and means for calculating pH from measured conductivity using the conductivity prediction steps in a backwards calculation mode.

Determination of the buffer concentration of the mixed liquid flow may be performed by measuring conductivity or measuring absorbance by a spectroscopic method, preferably (but not limited to) UV or NIR spectroscopy.

In a variant, the buffer concentration of the mixed liquid flow is determined by measuring the flow rates of the liquid flows containing buffer components (including strong acid or base), and calculating the buffer concentration from known (stock) concentrations of the respective liquid flows.

In another variant, determination of buffer concentration comprises measuring the conductivity or measuring absorbance by a spectroscopic method, preferably (but not limited to) UV or NIR spectroscopy on each of the liquid flows of the first and second sets, and determining from the measurements on the different liquid flows the buffer concentration of the mixed liquid flow.

In the method of the invention as described above, it is preferred that the liquid flows of the first set and the liquid flows of the second set are combined prior to being combined with the third set of liquid flows.

The desired characteristics of the mixed liquid flow may, however, include one or more further desired properties in addition to the above-mentioned first and second properties and/or the method may include the provision of a fourth and, optionally, more sets of liquid flows.

In this case, the method may comprise providing a fourth set of liquid flows each containing at least one additive, combining the fourth set of liquid flows with the first, second and third sets of liquid flows, and regulating the fourth liquid flow or flows of the fourth set to adjust the at least third property to its predetermined value or values.

A typical additive is a non-buffering salt, but other additives, such as detergents, may optionally also be provided.

In one variant of the method including a fourth liquid flow, the first property is pH, the second property is buffer concentration and the third property is additive concentration, preferably salt concentration.

In another variant, the first property is pH, the second property is buffer concentration and the third property is conductivity or absorbance.

In yet another variant, the first property is pH, the second property is conductivity and the third property is selected from additive concentration, conductivity and absorbance.

Preferably, the first and second sets of liquid flows and the third set of liquid flows are combined prior to being combined with the fourth set of liquid flows.

The different predetermined property values of the mixed liquid flow may be measured and/or calculated.

Typically, the properties of the mixed liquid flow are measured.

A variant of carrying out the method of the invention comprises providing a formula of a set of different liquid flows for obtaining the mixed liquid flow having the predetermined characteristics, and controlling the different liquid flows by flow-feedback according to the formula.

Another method variant comprises measuring the properties of the mixed liquid flows while varying the different liquid flows to adjust the properties to their predetermined values, determining the required liquid flows, and then controlling the different liquid flows by flow feedback.

Yet another method variant comprises providing a formula of a set of different liquid flows for obtaining the mixed liquid flow having the predetermined characteristics, and controlling the different liquid flows by flow-feedback according to the formula, and then fine-adjusting the different liquid flows by measuring the properties of the mixed liquid flow while varying the different liquid flows to adjust the respective properties to their predetermined values.

Still another method variant comprises measuring the properties of the mixed liquid flow while varying the different liquid flows to adjust the respective properties to their predetermined values, determining a formula of liquid flows (e.g. by using a so-called analogy machine) for obtaining the mixed liquid flow having the predetermined characteristics, and then controlling the different liquid flows by flow-feedback according to the formula.

The different liquid flows are typically controlled by means of pumps and/or valves.

In the method of the invention, a first set of measured properties may be used to obtain the mixed liquid flow having the predetermined characteristics, while a second set of measured properties may be used for verification.

In a variant of the method, a property of the mixed liquid flow may be determined by measuring an alternative property. The liquid flows are first varied to a set-point for the property by feedback from measuring one of the property and the alternative property. The liquid flows are then varied to the set-point by feedback from measuring the other of the property and the alternative property. Generally, the one of the property and the alternative property that gives the fastest feedback is used first to quickly reach a set-point, and the other (more accurate) property is then used for fine adjustment to the set-point.

The method may additionally comprise measuring characteristics of one or more of the first, second, third and fourth liquid flows to aid in ensuring the desired characteristics of the mixed liquid flow.

Preferably, alarm limits are provided for at least some of the predetermined characteristics of the mixed liquid flow to permit only the correct mixed liquid to leave the system.

As mentioned above, the invention is, however, not limited to the preparation of buffer flows, but other types of liquid mixtures or blends may be prepared by the method. For example, various types of alcohol mixtures may be prepared which have, for instance, predetermined fatty properties. The above-mentioned first set of liquid flows may then comprise a first alcohol having a first fatty property value, and the above-mentioned second set of liquid flows may comprise an alcohol having a second fatty property value, wherein mixing of the two alcohols in proper proportions will give the desired fatty value of the alcohol mixture.

In a particular embodiment of the invention, there is provided a method of preparing a buffer flow having a predetermined buffer concentration and a predetermined pH, comprising the steps of:

a) providing a first liquid flow of a basic buffer component of stock concentration,
b) providing a second liquid flow of an acidic buffer component of stock concentration,
c) providing a third liquid flow of aqueous liquid,
d) combining the liquid flows in proportions selected to provide a combined liquid flow having the predetermined buffer concentration, and
e) varying at least one of the first and second liquid flows to adjust the pH of the combined liquid flow to said predetermined pH while maintaining the predetermined buffer concentration by varying the third liquid flow.

Preferably, varying the first and second liquid flows maintains a constant delivery rate of buffer to the combined liquid flow, and the combined liquid flow (i.e. the total buffer flow) is kept constant by varying the third liquid flow.

In a variant of the method embodiment above, the desired buffer flow also has a predetermined concentration of salt. In this case, the method further comprises, between method steps d) and e) above, the step of providing a fourth liquid flow containing salt of stock concentration, combining the fourth liquid flow with the first, second and third flows to provide said combined liquid flow, and regulating the proportion of the fourth liquid flow to obtain said predetermined salt concentration in the combined liquid flow, while maintaining the combined liquid flow constant by varying the third liquid flow.

In another variant of the method embodiment above, the desired buffer flow comprises salt and has a predetermined conductivity. In this case, the method further comprises, between method steps d) and e) above, the step of providing a fourth liquid flow containing salt of stock concentration, combining the fourth liquid flow with the first, second and third liquid flows to provide said combined liquid flow, and regulating the proportion of the fourth liquid flow to obtain said predetermined conductivity of the combined liquid flow, while maintaining the combined liquid flow constant by varying the third liquid flow.

In still another variant of the method, the desired buffer flow has a predetermined pH but a predetermined conductivity rather than buffer concentration. In this case, the method comprises selecting an initial buffer concentration, and adjusting the pH as well as the conductivity of the combined liquid so that the predetermined pH and conductivity are obtained. The pH and conductivity adjustments may be performed sequentially (and optionally repeated) or simultaneously.

Specifically, such a variant comprises the steps of:
a) providing a first liquid flow of a basic buffer component of stock concentration,
b) providing a second liquid flow of an acidic buffer component of stock concentration,
c) providing a third liquid flow of aqueous fluid,
d) combining the liquid flows in proportions selected to provide a combined liquid flow having a selected initial buffer concentration, and
e) sequentially or simultaneously varying at least one of the first and second liquid flows to adjust the pH of the combined liquid flow to said predetermined pH and to adjust the conductivity of the combined liquid flow to said predetermined conductivity.

The method may conveniently be implemented by software run on an electrical data processing device, such as a computer. Such software may be provided to the computer on any suitable computer-readable medium, including a record medium, a read-only memory, or an electrical or optical signal which may be conveyed via electrical or optical cable or by radio or other means.

Another aspect of the invention therefore relates to a computer program product comprising instructions for causing a computer to perform the method steps of any one of the above-mentioned method variants.

Other preferred embodiments are set forth in the dependent claims.

A more complete understanding of the present invention, as well as further features and advantages thereof, will be obtained by reference to the following detailed description and the accompanying drawings.

DETAILED DESCRIPTION OF THE INVENTION

As mentioned above, the present invention relates to an improved method of producing a mixed liquid flow having predetermined characteristics. The mixed liquid flow is typically a buffer liquid flow having, for example, predefined buffer concentration and pH, and optionally also conductivity and/or salt concentration, or predefined pH and conductivity, especially for in-line delivery of buffer in industrial processes such as chromatography and filtering. In brief, to prepare such a buffer flow, for instance, a liquid flow having the predefined buffer concentration is first set using initial calculated proportions of buffer component flows of stock concentration and an aqueous flow. If required, salt is then added by a separate flow, the predefined buffer concentration being maintained by regulating the aqueous flow to keep the total buffer flow constant. Finally, the pH of the buffer flow is adjusted to the predefined pH by regulating the mutual buffer component flow proportions while regulating the other liquid flow or flows to maintain the predefined buffer concentration.

Instead of the user providing the mixing ratios of the different buffer components as in a blending system of the flow feedback control type, the final ratios are obtained automatically when the system reaches steady state and the mixing ratios can instead be read from the system which makes the buffer mixtures at the predefined pH, buffer concentration and conductivity (or salt concentration), when required. In this way, the correct buffer concentration will be obtained even if salt is used in the mixture.

More specifically, as will be described below, an equation for the conservation of mass is used to calculate how much the flow corresponding to one of the buffer components should be increased when the other component is decreased (or kept constant) upon a signal from the controlling pH sensor.

While the method is generally applicable to the preparation of mixed liquid flows for various purposes, such as buffer liquid flows, including isocratic and gradient buffer mixtures, the following detailed description will, by means of example only and not in any limiting sense, primarily be related to the fields of liquid chromatography and filtration, where pH and/or ionic strength of the liquid mixtures are of particular concern. Before describing the invention any further, three parameters of particular interest in the present invention, i.e. pH, conductivity and buffer concentration, will first be generally addressed.

pH and pH Control

The pH value describes the degree of acidity in a solution and is defined as the negative logarithm of the activity of hydrogen ions (or protons). Most biological processes are affected by pH changes, the reason being that pH affects the interactions at molecular level and molecular conformations. For the same reason, changes in pH can be used to control chromatographic processes, for example in the production of biopharmaceuticals, such as monoclonal antibodies. As an example, pH is a crucial parameter for the interaction between monoclonal antibodies and protein A chromatographic media.

The key to pH control is the buffer. The buffer is a kind of molecule that is able to accept or donate hydrogen ion. By adding a large number of such molecules to a solution, pH control can be attained by effectively reducing the rate of pH change as a function of the amount of hydrogen or hydroxyl ions. This "buffer capacity" is proportional to the buffer concentration. It is also possible to control pH by deliberate combination of the buffer molecule in two different protonation states. Since macroscopic chemical reagents must be electrically neutral, those that work as buffers can be forced to different protonation states by the presence of the appropriate amount of counter ions. This may, for example, be obtained by combining a "weak acid" with a corresponding weak base. For environmental or human safety reasons, this is preferable to combining the weak acid with a strong base (like NaOH), or a weak base with a strong acid (like HCl).

A key parameter for a buffer substance is its $pK_a$ value which is the pH value at which 50% of the buffer molecules are in each of two different protonation states. Some buffer substances like phosphate and citrate have several $pK_a$ values (polyprotic buffers). The $pK_a$ values of a substance can shift dramatically when the conductivity increases, for instance by adding salt to the buffer solution. The knowledge of the magnitude of such shifts for different buffer systems at different salt concentrations can be used for accurate pH control.

Conductivity

Since buffer substances are weak electrolytes there is no simple model that can relate the conductivity as a function of the concentration. Contributions to the conductivity of a buffer arise from different components which correspond to different protonation steps. The exact proportions of the different states depend upon the equilibrium and thus vary with the pH etc. An important contribution to the conductivity comes from strong electrolytes, for instance $Na^+$ and $Cl^-$ ions, especially at higher salt concentrations. Conductivity control is important because the conductivity (or the ionic strength) also can effect intermolecular interactions and can therefore be used to control the chromatographic processes for bio-pharmaceutical production, especially such using ion exchange chromatography or hydrophobic interaction chromatography. Adding salts like NaCl or $Na_2SO_4$ is a cost effective way to increase the conductivity of a solution. The conductivity is also a good measure of the concentration of a solution even if the relation between the two is not trivial. Knowledge of this relation for instance obtained empirically can be used to determine if the concentration or the stock solution is correct.

Buffer Concentration

The buffer concentration is important mainly because of two major reasons. The main reason is related to the circumstance that the buffer capacity is proportional to the buffer concentration. Understanding the dependence of the buffer capacity on the buffer composition is of outmost value since use of buffers with too low buffer capacity during purification can lead to low process robustness and poor yields. The buffering capacity of a particular system is itself sensitive to mainly two factors: the $pK_a$ value of the buffering substance is one of them and the buffer concentration the other. As a rule of thumb the pH will be stable in a symmetric interval around the $pK_a$ value. However the width of the interval with good buffer capacity is dependent on the buffer concentration with the relation the higher the buffer concentration the wider the interval. The real center of the interval, the so-called $pK_a'$ value is almost always shifted from the tabulated $pK_a$ value which is an interpolation to the ideal case infinite dilution. The requirement for good buffer capacity usually sets a lower limit to the buffer concentration. A higher limit to the buffer concentration is usually set by non desired effects of having too much buffer in the solution. One of these effects may be too high conductivity. In other cases, however, high conductivity may be desirable which leads to the second use or importance of buffer concentration, i.e. for some applications it may be appropriate to use the buffering salt to adjust the conductivity to high levels without the use of non-buffering salt.

Turning now to the invention, the preparation of a desired buffer flow using pH and conductivity feedback control in accordance with the invention will be described below with reference to FIG. 1 which shows in diagrammatic form an embodiment of blending system or arrangement which can be used for preparing buffers having pre-defined buffer concentration, pH and optionally conductivity or salt concentration, for example for use in chromatography, in accordance with the method of the present invention.

A flow of stock solution of an acidic buffer component B1 is supplied through a conduit 1, and stock solution flow of a basic buffer component B2 is supplied through a conduit 2. Conduits 1 and 2 are joined at a first junction 3.

Water (WFI—water for injection) is supplied through a conduit 4, and, when required, salt solution is supplied through a conduit 5. Conduits 4 and 5 are joined at a second junction 6.

The first and second junctions 3 and 6 are connected through respective conduits 8 and 9 to a third junction 7, which in turn connects to a buffer delivery conduit 10. The conduit 10 is provided with a pH sensor 11 and a conductivity sensor 12.

Through an optional conduit or conduits, indicated by dashed line 13, one or more additives may be added, for example, detergent, organic solvent (e.g. DMSO), etc.

Figure 1:
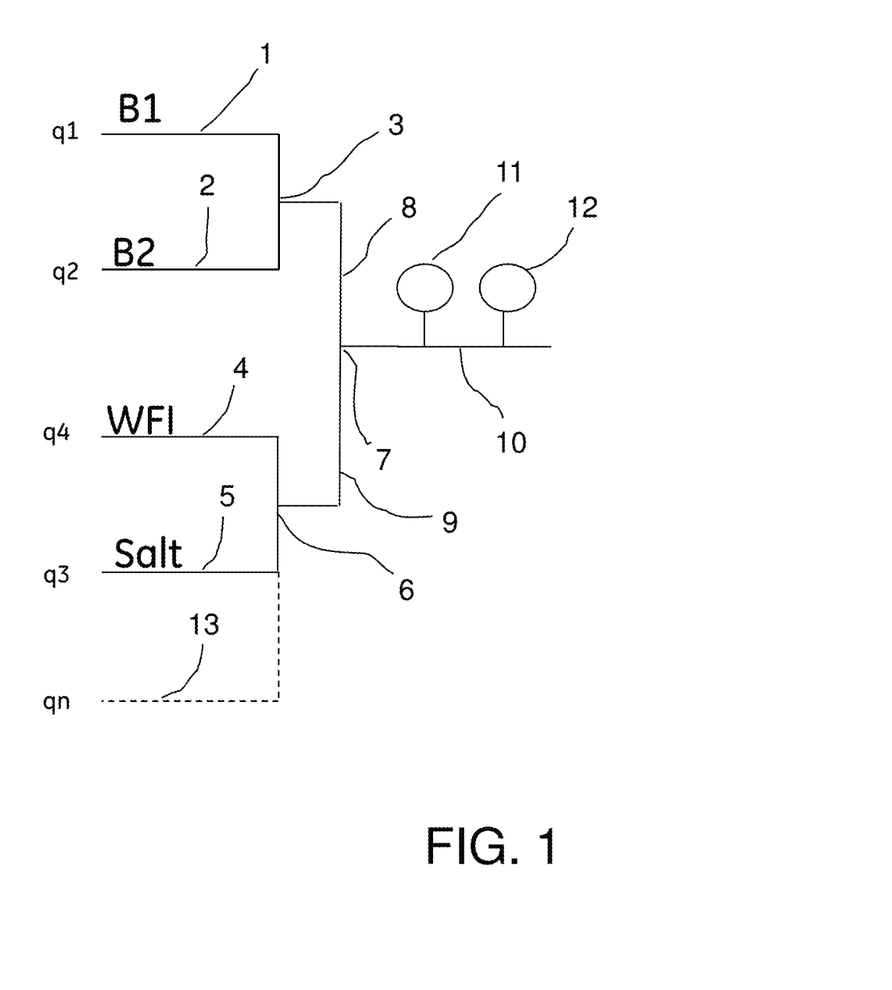
FIG. 1 is a schematic diagram of a liquid blending system which may be used in the method of the present invention.

The designations q1, q2, q3, q4 and qn in FIG. 1 denote the flow rates (e.g. L/h), or alternatively the proportions (e.g. %), of B1, B2, salt solution, WFI, and additive (if any), respectively, of the total flow.

The system further comprises pumps and flow meters (not shown), and optionally one or more additional sensors.

It is to be noted that, as mentioned above, the arrangement or system shown in FIG. 1 for performing the method of the invention is only an example, and may be varied.

Through the system outlined above, for example, a buffer with a predefined pH having a specific buffer concentration C and a specific salt concentration may be automatically prepared given stock solutions of salt solution (Salt) and acid B1 and base B2 solutions. Buffer components B1 and B2 may be a corresponding acid/base buffering substance pair, or one of them may be a strong acid or base and the other a buffering substance. A buffer component B1 or B2 may also be a mixture of two or more components.

Exemplary buffers that may be produced using this liquid blending system include phosphate, acetate, citrate, tris and bis-tris buffers, mixed acetate/phosphate buffer, and mixed acetate/format/phosphate buffer, just to mention a few. To prepare, for instance, a mixed acetate/format/phosphate buffer, the acidic component B1 may be e.g. HCl and the basic component B2 may be a mixture of e.g. sodium acetate, sodium formate and sodium phosphate.

It is also assumed that the total flow $\underline{qT}$ is known and constant. It has been taken into consideration that even if the salt is not a buffer, the change in ionic strength may lead to a shift in the $pK_a$ values of the buffering substances.

Typically used non-buffering salts include, for instance, sodium chloride and calcium chloride.

A strategy for using the system outlined above for the preparation of desired buffers will now be described, by way of example only, making use of a number of up to three subsequent steps that have to be addressed according to four different assumed scenarios or cases depending on desired specifications by the user of the buffer, as described in Table 1 below.

TABLE 1

| Case | Salt | Specified buffer concentration | Specified salt concentration | Specified conductivity |
|------|------|-------------------------------|------------------------------|------------------------|
| 1 | Yes | Yes | No | Yes |
| 2 | No | No | No | Yes |
| 3 | No | Yes | No | No |
| 4 | Yes | Yes | Yes | No |

Using this division the steps of the procedure are defined according to the following:

The conductivity values measured by the conductivity sensor 12 in FIG. 1 will below be referred to as "Cond", and the pH values measured by the pH sensor 11 as "pH".

Step 1 All Cases

Calculate initial proportions (percentages), for B1 and B2 as follows. C is buffer concentration, q1 to q4 denote flow or, alternatively, percentage of B1, B2, salt, and WFI, respectively.

As indicated in Table 1 above, the buffer concentration C is specified for Cases 1, 3 and 4, whereas Case 2 has no specification for buffer concentration. In the latter case, a suitable initial buffer concentration is therefore selected in Step 1, e.g. 50 mM.

For B1=weak acid and B2=weak base:
q1=(C*0.5)/(stock concentration B1)*100
q2=(C*0.5)/(stock concentration B2)*100

For B1=strong acid and B2=weak base:
q1=0
q2=100*C/(stock concentration B2)

For B1=weak acid and B2=strong base:
q1=100*C/(stock concentration B1)
q2=0

Set percentage Salt (q3) to 0 and percentage WFI (q4) to q4=100−q1−q2−q3 (if in %) and q4=qT−q1−q2−q3 (if in flow, the same for the rest of the workflow), where qT is the total flow. This total flow requirement is kept for the rest of the process.

In case a liquid flow (or flows) qn of additive is (are) added through a conduit(s) 13 in FIG. 1, each such additive flow is treated in the same way as Salt.

It is readily seen that by using settings calculated as described above, the buffer concentration will be correct already from the beginning, for example in the case of weak acid—weak base with 0.5 C coming from each stock B1 and B2.

The above suggested settings are, however, only exemplary, and may be varied. Preferably, the B1/B2 proportions are calculated to provide a pH in the vicinity of the desired predefined pH value.

Start running the system with the above described settings.

Step 2 Case 1

Start using conductivity, as sensed by conductivity sensor 12 (FIG. 1), to regulate q3. If Cond is below target increase q3, and if Cond is above target decrease q3.

Both q1 and q2 are kept constant.

q4 is given by: q4=100−q1−q2−q3.

Case 2

Skip step 2.

Case 3

Skip step 2.

Case 4

Set q3=100*(Salt concentration)/(Salt stock concentration) (works independently of whether concentration is given in M or in %).

q1 and q2 are kept constant, and $$q4=100-q1-q2-q3.$$

Step 3, All Cases but Case 2

Start using pH to regulate proportions at junction 3 in FIG. 1 until the final pH specification is satisfied.

For B1=weak acid and B2=weak base:
q1 increases if pH is above target and decreases if pH is below target;
q2=(100*C−(stock concentration B1)*q1)/(stock concentration B2).

For B1=strong acid and B2=weak base:
q1 increases if pH is above target and decreases if pH is below target.

For B1=weak acid and B2=strong base:
q2 decreases if pH is above target and increases if pH is below target.

$$q4=100-q1-q2-q3$$

In this way the total buffer concentration given by:
(q1/100)*(stock concentration B1)+(q2/100)*(stock concentration B2)=C is kept constant.

STEP 3 Case 2 Only (Alternative 1)

If Abs(pH-Target)>=Epsilon

"Epsilon" is a small value, typically about 0.02 pH units or smaller.

For B1=weak acid and B2=weak base:
q1 increases if pH is above target and decreases if pH is below target.
q1 changes by Δq.
q2 changes by −Δq*(stock concentration B1)/(stock concentration B2).

For B1=strong acid and B2=weak base:
q1 increases if pH is above target and decreases if pH is below target;
q2 is kept constant.

For B1=weak acid and B2=strong base:
q1 is kept constant;
q2 decreases if pH is above target and increases if pH is below target.

$$q4=100-q1-q2-q3$$

If Abs(pH-Target)<Epsilon

Use conductivity, as sensed by conductivity sensor 12 (FIG. 1), to regulate proportions at the third junction 7 in FIG. 1 until the final conductivity specification is satisfied.

For B1=weak acid and B2=weak base:
q1 changes by Δq;
q2 changes by Δq*(stock concentration B1)/(stock concentration B2.)

For B1=strong acid and B2=weak base:
q1 is kept constant;
q2 changes by Δq.

For B1=weak acid and B2=strong base:
q1 changes by Δq;
q2 is kept constant.

$$q4=100-q1-q2-q3$$

It is to be noted that in this alternative, the pH and conductivity adjustment procedures are not performed simultaneously but one at a time.

STEP 3 Case 2 Only (Alternative 2)

pH and conductivity are regulated simultaneously as follows to level off the difference between desired values and actual values, e.g. through ΔpH and ΔCond, respectively.

$\Delta q_{pH}$ is the change in B1 and B2, respectively, for pH adjustment $\Delta q_C$ is the change in B1 and B2, respectively, for conductivity adjustment x=(stock concentration B1)/(stock concentration B2)

For B1=weak acid and B2=weak base (four cases):

| pH > target and Cond < target | | | |
|---|---|---|---|
| | pH | Cond | Total |
| B1 | $+\Delta q_{pH}$ | $+\Delta q_C$ | $\Delta q_{pH} + \Delta q_C$ |
| B2 | $-\Delta q_{pH}/x$ | $+\Delta q_C/x$ | $-\Delta q_{pH}/x + \Delta q_C/x$ |

| | pH < target and Cond < target | | |
|---|---|---|---|
| | pH | Cond | Total |
| B1 | $-\Delta q_{pH}$ | $+\Delta q_C$ | $-\Delta q_{pH} + \Delta q_C$ |
| B2 | $+\Delta q_{pH}/x$ | $+\Delta q_C/x$ | $\Delta q_{pH}/x + \Delta q_C/x$ |

| | pH > target and Cond > target | | |
|---|---|---|---|
| | pH | Cond | Total |
| B1 | $+\Delta q_{pH}$ | $-\Delta q_C$ | $\Delta q_{pH} - \Delta q_C$ |
| B2 | $-\Delta q_{pH}/x$ | $-\Delta q_C/x$ | $-\Delta q_{pH}/x - \Delta q_C/x$ |

| | pH < target and Cond > target | | |
|---|---|---|---|
| | pH | Cond | Total |
| B1 | $-\Delta q_{pH}$ | $-\Delta q_C$ | $-\Delta q_{pH} - \Delta q_C$ |
| B2 | $+\Delta q_{pH}/x$ | $-\Delta q_C/x$ | $\Delta q_{pH}/x - \Delta q_C/x$ |

For B1=strong acid and B1=weak base, or B1=weak acid and B1=strong base: pH is adjusted by keeping the weak acid (or base) constant, and varying the strong base (or acid).

As apparent from the above, the pH adjustment does not change the buffer concentration.

For the control of the buffer preparation as described above for a chromatography system, the software used for controlling the chromatography system, if any, may be used. An exemplary such software is the Unicorn™ control system (GE Healthcare Bio-Sciences AB, Uppsala, Sweden), which is based on a controller and I/O interface with a computer graphical user interface, being an integral part of the control system.

Example 1

Test of Buffers with pH and Conductivity Feedback System

A liquid blending system, basically corresponding to that shown in FIG. 1, was used to prepare a liquid flow of three buffer mixtures A3, C3 and P6, as specified in Table 2 below. The flow, conductivity and pH of the prepared buffer were continuously monitored.

TABLE 2

| Test ID | Buffer system | Stock solution 1 | Stock solution 2 | Stock solution 3 |
|---|---|---|---|---|
| A3 | 100 mM acetate pH 5.0 | 0.5M HAc | 1.0M NAc*3H$_2$0 | n/a |
| C3 | 100 mM citrate pH 3.5 | 0.5M Citric acid*1H$_2$O | 0.5M Na3 Citrate*2H$_2$O | n/a |
| P6 | 30 mM phosphate pH 6.5 | 0.4M NaH$_2$PO$_4$*1H2O | 0.4M Na$_2$HPO$_4$*2H$_2$O | n/a |

Figure 2:
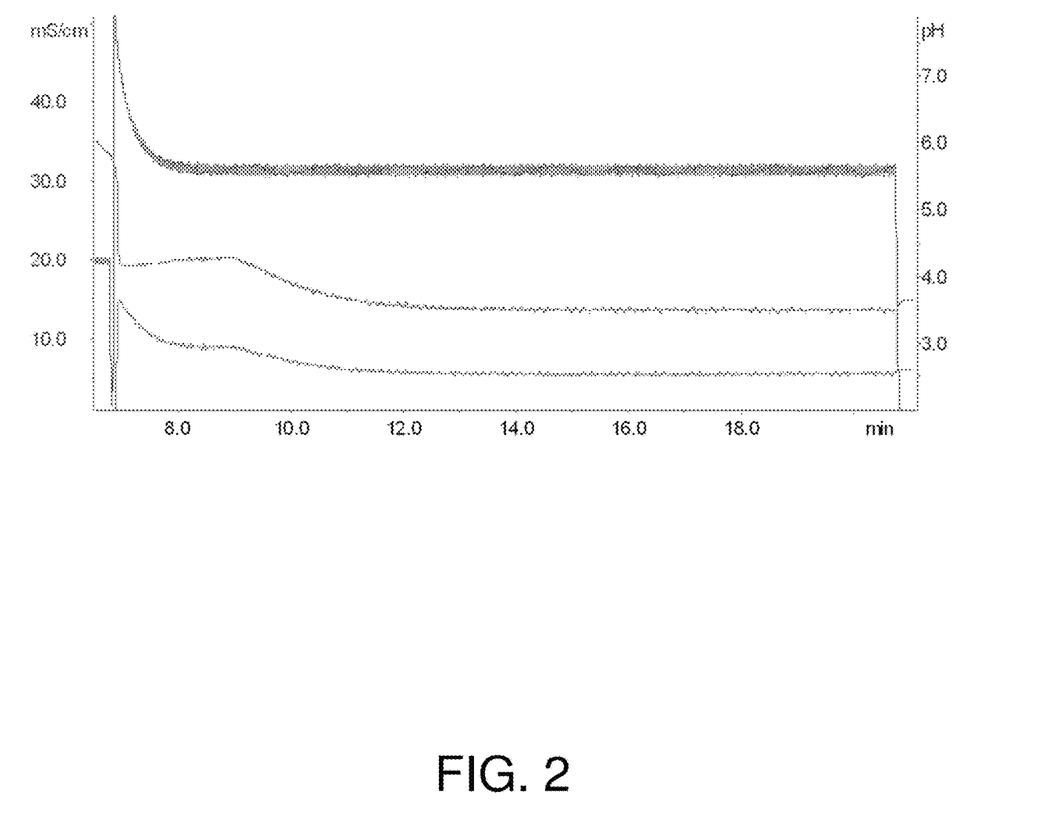
FIG. 2 is a set of graphs showing the variation of the total flow, pH, and conductivity, respectively, during the mixing of stock solutions for the preparation of a 100 mM citrate buffer, pH 3.5.

The results of the run of buffer C3 is shown in FIG. 2 and described below. In FIG. 2, the top curve is the combined flow, the middle curve is pH, and the bottom curve is the conductivity.

With reference to FIG. 2, the following results were obtained:

Flow 400 L/h: 389-411 L/h, average 399.9 L/h
pH 3.45-3.54, average 3.50
Conductivity 5.24-5.84 mS/cm, average 5.53 mS/cm
Time to equilibrium: Flow 1.6 min, pH 4.9 min, Cond 4.9 min As apparent from the graphs in FIG. 2, efficient mixing producing a stable buffer flow with the desired pH and conductivity was obtained in a short time.

Comparison of the obtained end values for the flow to the ratios obtained from the recipes used above are shown in Table 3 below.

TABLE 3

| | Target | Off line | Off line | In line | |
|---|---|---|---|---|---|
| Test ID | pH | lab | from flow | Interval | Average |
| A3 | 5.00 | 4.98 | 5.00 | 4.95-5.01 | 4.98 |
| C3 | 3.50 | 3.60 | 3.66 | 3.45-3.54 | 3.50 |
| P6 | 6.50 | 6.58 | 6.57 | 6.48-6.53 | 6.50 |

As apparent from the above results, the in-line pH values showed excellent agreement with the expected values, however the off-line values were significantly higher (due to error of the in-line pH measurements).

A comparison of the flow feedback mixing ratios for the pH and conductivity feedback runs is shown in Table 4 below.

TABLE 4

| | | Mixing ratio (%) 1:2:3:Water (flow feedback runs) These ratios correspond to recipes obtained from analytically |
|---|---|---|
| Test ID | Flow End value | solving the equilibrium equations |
| A3 | 6.7:8.2:0:85.1 | 6.60:6.50:0:86.90 |
| C3 | 13.2:5.7:0:81.1 | 13.88:5.22:0:80.90 |
| P6 | 5.1:2.2:0:92.8 | 5.39:1.90:0:92.71 |

From Table 4 it can also be seen that in the cases where the two pH values do not differ so much then the ratios are also very similar, i.e. the system has been working as an analogue solver of the set of equilibrium equations.

Example 2

Formulation of Buffers

A liquid blending system, basically corresponding to that shown in FIG. 1, was used for buffer formulation according to method of the invention. The results are shown in FIGS. 3 and 4.

Concentrates of corresponding acid/base, and salt and WFI were used to formulate different buffers in sequence from the same set of concentrates. Algorithms considering stock concentration were used to determine the recipe to achieve correct pH and concentration using flow feedback (FIG. 3, bottom). As alternative approaches, flow feedback was combined with pH feedback (FIG. 3, top, and FIG. 4, top) and pH feedback was combined with conductivity feedback (FIG. 4, bottom). The later options allow larger variations in stock concentration.

Figure 3:
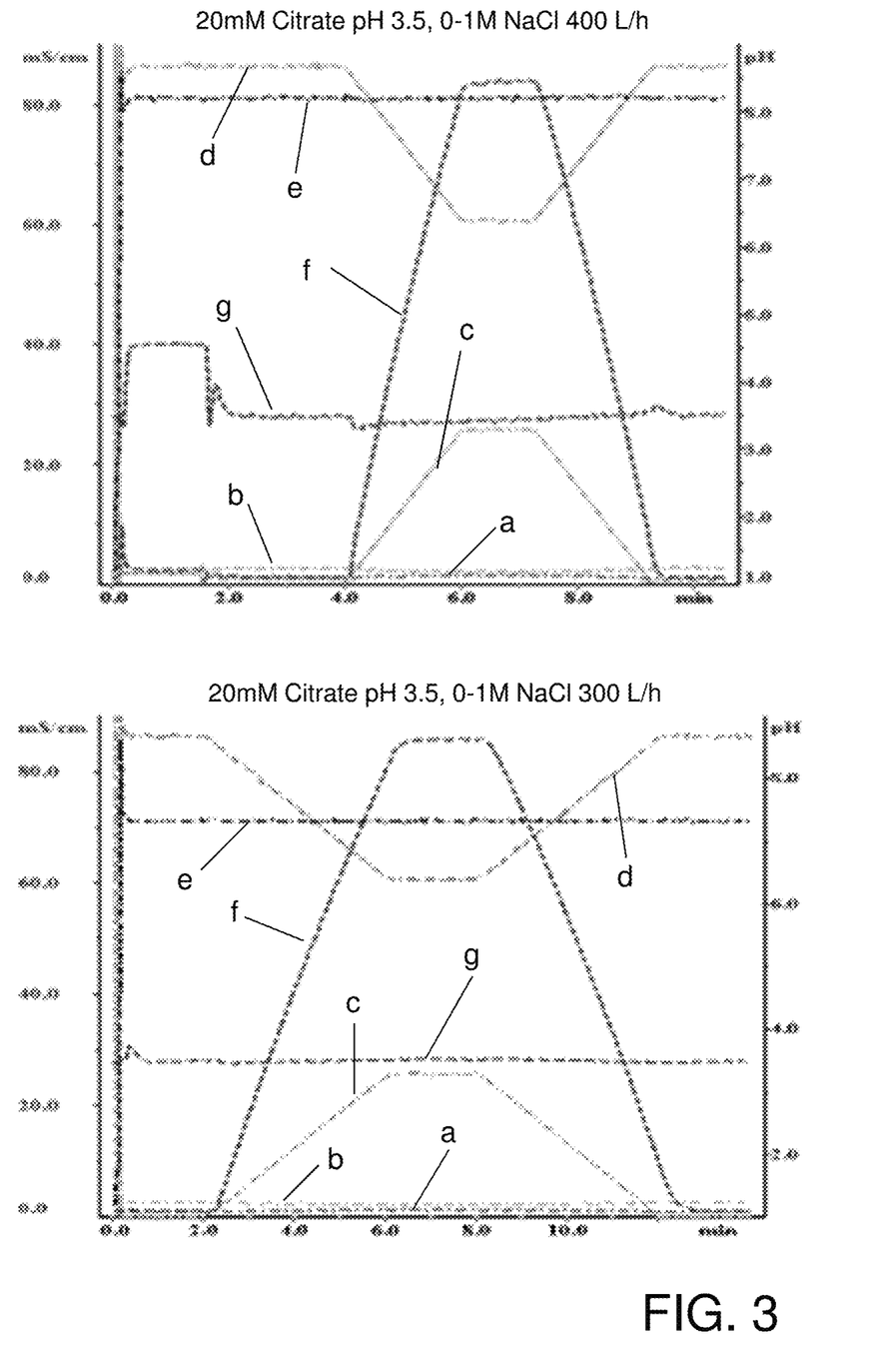
FIG. 3 shows two diagrams indicating the variation of process parameters during a blending operation for the preparation of salt gradients using two different strategies.

With reference to FIG. 3, salt gradients were prepared using 20 mM citrate, pH, 3.5, 0-1M NaCl, and flow rates 400 (top) and 300 (bottom) L/h, respectively. Two different strategies were used. Top diagram: pH feedback for the base (flow rate is curve a) and the acid (curve b) combined with flow feedback for the salt (curve c) and the WFI (curve d). Bottom diagram: Flow feedback with recipe for all the components where the recipe is continuously updated along the gradient. Total flow rate is shown in curve e, conductivity in curve f, and pH in curve g.

Figure 4:
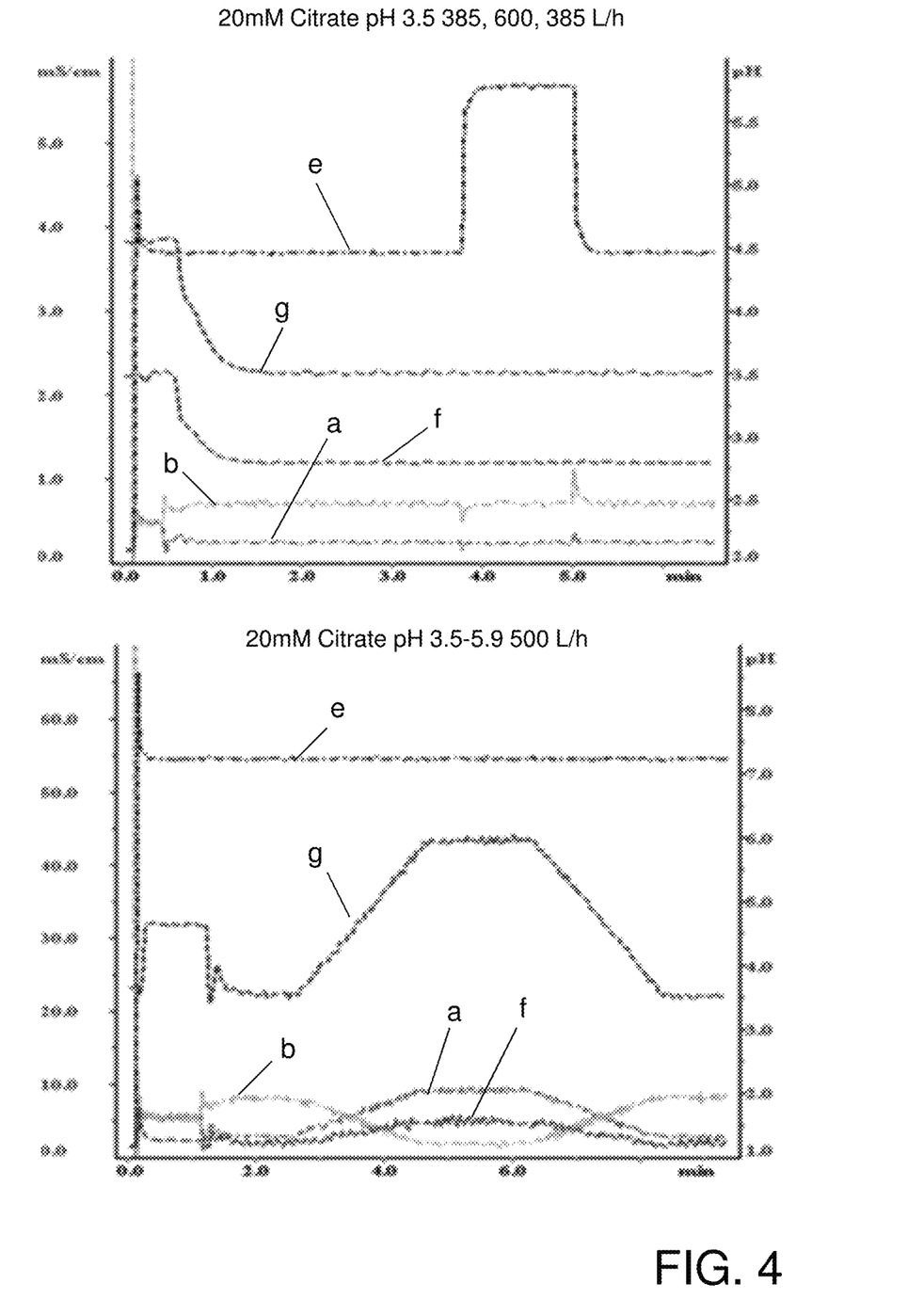
FIG. 4 shows two diagrams indicating the variation of process parameters during a blending operation using constant buffer concentration (top) and pH gradient (bottom), respectively.

With reference to FIG. 4, the top diagram shows the variation of different parameters using 20 mM citrate, pH 3.5, and flow feedback for the base (curve a) and the acid (curve b) combined with the constraint of constant buffer concentration through a step in total flow rate, 385, 600 and 385 L/h (curve e). Curve f is conductivity and curve g is pH.

The bottom diagram shows the application of a pH gradient using pH and conductivity feedback, with 20 mM citrate, pH 3.5-5.9, and flow rate 500 L/h.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A process for providing a mixed liquid, the process comprising:
combining, in a system, flows of a plurality of liquid components to obtain the mixed liquid, the combining including:
providing the mixed liquid as an output of the process using a set of conduits of the system consisting of a first conduit and a second conduit joined at a first junction, a third conduit and a fourth conduit joined at a second junction, and an output conduit connecting to the first, second, third and fourth conduits at a common junction, wherein the output conduit does not feed into the first conduit, second conduit, third conduit, or fourth conduit, and wherein the output conduit includes at least one sensor;
varying flow rates of a first liquid component introduced in the system via the first conduit and of a second liquid component introduced in the system via the second conduit, the varying performed while keeping a flow rate of the mixed liquid at a predetermined level, and wherein the first and second liquid components are amongst the plurality of liquid components and wherein the mixed liquid further includes a third liquid component introduced in the system via the third conduit;
measuring, in the output conduit using the at least one sensor a current value of a first property in the mixed liquid and a current value of a second property in the mixed liquid, wherein the first and second properties are different;
adjusting the flow rates of the first and second liquid components based on a first feedback loop associated with the first property and a second feedback loop associated with the second property until the current value of at least one of the first and second properties reaches a set-point;
providing the mixed liquid as the output of the process at the fourth conduit, when the current value of the at least one first and second properties reaches the set-point; and
adjusting the current value of the first property to a first threshold or the current value of the second property to a second threshold by varying a flow rate of at least one liquid component.

2. The process of claim 1, wherein the first and second properties are selected from the group consisting of pH, conductivity, and absorbance.

3. The process of claim 1, wherein the plurality of liquid components includes a solvent.

4. The process of claim 3, wherein the solvent is water.

5. The process of claim 1, wherein the first property is pH and the second property is a buffer concentration, and wherein the adjusting is performed until the current value of the first property reaches a predetermined pH value.

6. The process of claim 1, wherein the first property is a property other than pH and the second property is a buffer concentration.

7. The process of claim 6, wherein the property other than pH is selected from the group consisting of conductivity and absorbance.

8. The process of claim 5, wherein the measuring includes determining a pH value.

9. The process of claim 8, wherein the determining the pH value includes measuring a conductivity.

10. The process of claim 5, wherein the measuring includes determining a buffer concentration value.

11. The process of claim 10, wherein determining the buffer concentration value includes measuring one of conductivity and absorbance.

12. The process of claim 11, wherein measuring absorbance includes performing a spectroscopic method selected from the group consisting of ultra-violet (UV) spectroscopy and (NIR) near-infrared spectroscopy.

13. The process of claim 5, wherein the measuring includes determining one of conductivity and absorbance.

14. The process of claim 13, wherein measuring absorbance includes performing a spectroscopic method selected from the group consisting of ultra-violet (UV) spectroscopy and (NIR) near-infrared spectroscopy.

15. The process of claim 1, wherein the mixed liquid is obtained by initially mixing a first set of liquid components and a second set of liquid components to create an intermediate liquid and subsequently mixing the intermediate liquid with a third set of liquid components.

16. The process of claim 1, wherein the mixed liquid has a third property, and the process further comprises mixing a first, second, and third set of liquid components together to yield an intermediate liquid, and subsequently mixing the intermediate liquid with a fourth set of liquid components.

17. The process of claim 16, wherein each liquid component of the fourth set includes at least one additive.

18. The process of claim 17, wherein the at least one additive includes a non-buffering salt.

19. The process of claim 17, further comprising varying a flow rate of at least one liquid component in the fourth set of liquid until the third property reaches a threshold.

20. The process of claim 16, wherein the first property is pH, the second property is buffer concentration, and the third property is one of conductivity and absorbance.

21. The process of claim 1, wherein the varying includes varying a first flow rate and a second flow rate, wherein the first flow rate and the second flow rate are varied either simultaneously or sequentially.

22. The process of claim 1, wherein varying the flow rates is performed by flow feedback.

23. The process of claim 1, wherein the adjusting includes providing alarm limits.

24. A process for providing a mixed liquid, the process comprising:
- combining, in a system, flows of a plurality of liquid components to obtain the mixed liquid, the combining including:
- providing the mixed liquid as an output of the process using a set of conduits of the system, the set of conduits comprising a plurality of conduits including at least two conduits joined at a first junction and an end conduit joined to the at least two conduits at common junction via a set of intervening conduits, and wherein the end conduit includes at least one sensor;
- varying flow rates of a first liquid component introduced in the system via a first conduit of the plurality of conduits and of a second liquid component introduced in the system via a second conduit of the plurality of conduits, the varying performed while keeping a flow rate of the mixed liquid at a predetermined level, and wherein the first and second liquid components are amongst the plurality of liquid components and wherein the mixed liquid further includes a third liquid component introduced in the system via a third conduit of the plurality of conduits;
- measuring, in the end conduit using the at least one sensor a current value of a first property in the mixed liquid and a current value of a second property in the mixed liquid, wherein the first and second properties are different;
- adjusting the flow rates of the first and second liquid components based on a first feedback loop associated with the first property and a second feedback loop associated with the second property until the current value of at least one of the first and second properties reaches a set-point;
- providing the mixed liquid as the output of the process at the end conduit when the current value of the at least one first and second properties reaches the set-point; and
- adjusting the current value of the first property to a first threshold or the current value of the second property to a second threshold by varying a flow rate of at least one liquid component; and
- wherein the process does not comprise a recirculation loop.

* * * * *